(12) United States Patent
Juncker et al.

(10) Patent No.: US 12,045,363 B2
(45) Date of Patent: *Jul. 23, 2024

(54) APPLICATION-BASED FILE EXFILTRATION DETECTION

(71) Applicant: Code42 Software, Inc., Minneapolis, MN (US)

(72) Inventors: Robert Juncker, Lakeville, MN (US); Neil Kulevsky, Minneapolis, MN (US); Andrew Moravec, Hugo, MN (US); James Sablatura, Minneapolis, MN (US); Shane Zako, Minneapolis, MN (US)

(73) Assignee: Code42 Software, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,363

(22) Filed: May 8, 2023

(65) Prior Publication Data

US 2023/0274017 A1    Aug. 31, 2023

Related U.S. Application Data

(63) Continuation of application No. 17/242,843, filed on Apr. 28, 2021, now Pat. No. 11,720,702.

(51) Int. Cl.
*G06F 21/62*    (2013.01)
*G06F 16/17*    (2019.01)
(Continued)

(52) U.S. Cl.
CPC ...... *G06F 21/6218* (2013.01); *G06F 16/1734* (2019.01); *G06F 16/176* (2019.01); *G06F 21/52* (2013.01)

(58) Field of Classification Search
CPC .... G06F 21/6218; G06F 21/52; G06F 21/554; G06F 16/1734; G06F 16/176; H04L 63/1416
See application file for complete search history.

(56) References Cited

U.S. PATENT DOCUMENTS 7,627,569 B2 * 12/2009 Gafter ................. G06F 21/6209
10,091,222 B1 * 10/2018 Langton .............. H04L 63/1441
(Continued)

OTHER PUBLICATIONS

"U.S. Appl. No. 17/242,843, Notice of Allowance mailed Mar. 20, 2023", 15 pgs.
(Continued)

*Primary Examiner* — Han Yang
(74) *Attorney, Agent, or Firm* — Schwegman Lundberg & Woessner, P.A.

(57) ABSTRACT

Disclosed in some examples are methods, systems, and machine readable mediums for applications that detect indicators of data exfiltration through applications such as browser-based interfaces. The disclosed system monitors file system element events related to one or more target applications (such as browsers) through operating system interfaces. Once an event of interest is detected, the system interfaces with the browser to determine a context for the event of interest that may include a URL of a website that the user was visiting corresponding to the file system element event. If the URL is directed towards a prohibited site, a notification may be generated that may be used as a signal to alert an administrator. As used herein, a file system element may include a file, directory, folder, archive, blob, raw storage, metadata, or the like. File system element events may include copying, deleting, modifying, or moving a file system element. A file system element event may be detected by monitoring Input/Output requests of a comput-
(Continued)

ing device to write to a file; move a file; delete a file; or the like.

20 Claims, 6 Drawing Sheets

(51) Int. Cl.
*G06F 16/176* (2019.01)
*G06F 21/52* (2013.01)

(56) References Cited

U.S. PATENT DOCUMENTS

| | | | | |
|---|---|---|---|---|
| 10,326,778 | B2* | 6/2019 | Gong | H04L 63/1425 |
| 11,310,248 | B2* | 4/2022 | Blewett | H04L 63/1416 |
| 11,449,603 | B2* | 9/2022 | Tietz | G06F 16/11 |
| 11,720,702 | B2 | 8/2023 | Juncker et al. | |
| 2015/0205962 | A1* | 7/2015 | Swidowski | G06F 21/554 |
| | | | | 726/23 |
| 2022/0156369 | A1* | 5/2022 | Narayanaswamy | H04L 9/0872 |
| | | | | 713/168 |
| 2022/0350905 | A1 | 11/2022 | Juncker et al. | |
| 2023/0076201 | A1* | 3/2023 | Bebchuk | H04L 63/0227 |

OTHER PUBLICATIONS

U.S. Appl. No. 17/242,843, filed Apr. 28, 2021, Application-Based File Exfiltration Detection.

* cited by examiner

APPLICATION-BASED FILE EXFILTRATION DETECTION

PRIORITY APPLICATIONS

This application is a continuation of U.S. patent application Ser. No. 17/242,843, filed Apr. 28, 2021, the content of which is incorporated herein by reference in its entirety.

TECHNICAL FIELD

Embodiments pertain to detection of file exfiltration. Some embodiments relate to detection of file exfiltration done by users through client-applications. Some embodiments relate to detection of file exfiltration done by users through browsers.

BACKGROUND

Companies with valuable data stored electronically such as source code, customer lists, engineering designs, sensitive emails, and other documents are increasingly subject to attempts to steal that data. Outsiders may attempt to hack computer networks using viruses; worms; social engineering; or other techniques to gain access to data storage devices where valuable data is stored. Another threat is exfiltration of data by insiders. These insiders may be motivated to steal employer data by greed, revenge, a desire to help a new employer, or other motivations. Detecting insider threats is particularly difficult as the insiders may have been granted authorized access to the files they are stealing and so many of the traditional methods of detection and prevention do not work. For example, a company may be alerted to an external attack by the attacker trying a number of different combinations of passwords and usernames hoping that one will work. Since insiders are already authorized, these traditional signals are of no use in detecting insider data exfiltration. In addition to cases of malicious exfiltration such as theft, in some examples, it may be possible that users have exfiltrated data by accident. For example, by uploading data to the wrong site or account.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
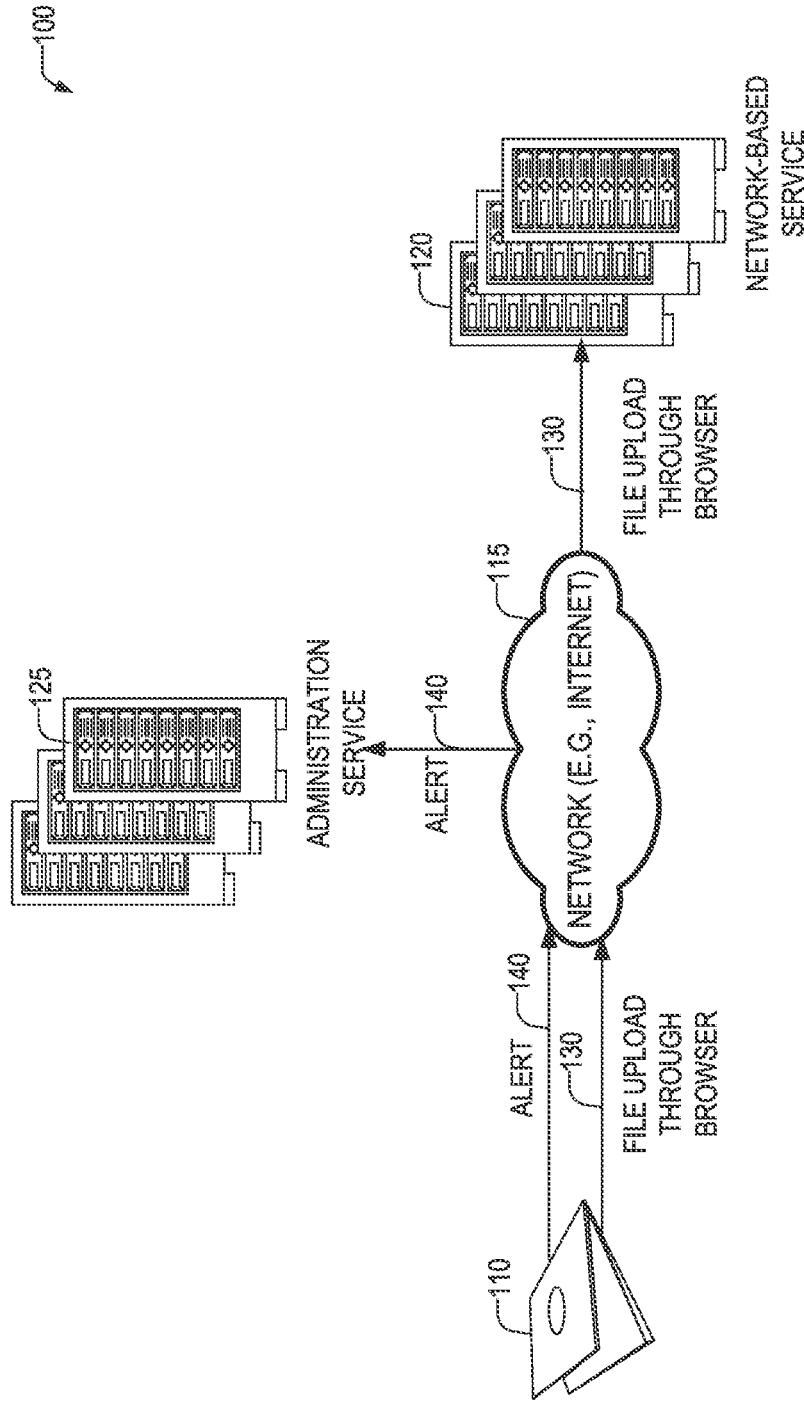
FIG. 1 illustrates an example environment for the exfiltration detection system according to some examples of the present disclosure.

Some methods of detecting insider exfiltration of files may use activity signatures that look for certain patterns of behavior. For example, an application may detect a user accessing certain files that the user would not normally access, accessing certain files at hours they would not normally access the files at, detecting large transfers of files to or from an external storage device, detecting movement of files to or from a directory linked to a cloud storage account, or the like.

These detection techniques do not work well for exfiltration of data through certain applications such as a web-browsers. That is, a user opens a web browser, navigates to a page for a cloud-based storage and sharing service (e.g., such as DropBox™, OneDrive™, or similar), and uploads the files through that page. This type of exfiltration is difficult to detect because the activity of the application obscures the user's activity. For example, browsers do not generally advertise their activity to other processes on the system. Furthermore, a browser's normal activity involves many different file system element events such that finding exfiltration among the many other file activities that normally happen with browser usage is akin to finding a needle in the proverbial haystack. Finally, even if usage of protected data in a browser was detected, it is impossible to tell what remote site was being used. The users uploading of data may be in conjunction with legitimate sites.

In some examples, solutions to this problem may include using browser plug-ins or monitoring network traffic as a "person-in-the-middle." Browser plugins have numerous problems with both development, reliability, and administration. Because each plugin may have different ways of interfacing with the browser, each plugin may require different codebases. Having multiple simultaneous codebases increases both development and testing costs. Compatibility can be an issue as well as browser plugins may introduce bugs and instability issues. This may be especially true when the developer has to support multiple different code-bases and testing programs as previously discussed. In addition, requiring users to install browser plugins requires cooperation from users or requires network administrator involvement. This is inconvenient and costly.

Person-in-the-middle software monitors network packets from the client to a destination. There are several issues to this approach. First, it adds network latency as each packet sent from an endpoint to a server goes through this software. Second, many links between servers and endpoints are encrypted. This software either cannot read the encrypted traffic or has to act as the endpoint of the encryption. This increases complications and could potentially carry security risks. In addition, it raises certain privacy issues where employee traffic may be monitored in ways undesirable to an organization.

Disclosed in some examples are methods, systems, and machine readable mediums for applications that detect indicators of data exfiltration through applications such as browser-based interfaces. The disclosed system monitors file system element events related to one or more target applications (such as browsers) through operating system interfaces. Once an event of interest is detected, the system interfaces with the browser to determine a context for the event of interest that may include a URL of a website that the user was visiting corresponding to the file system element event. If the URL is directed towards a prohibited site, a notification may be generated that may be used as a signal to alert an administrator. As used herein, a file system element may include a file, directory, folder, archive, blob, raw storage, metadata, or the like. File system element events may include copying, deleting, modifying, or moving a file system element. A file system element event may be detected by monitoring Input/Output requests of a computing device to write to a file; move a file; delete a file; or the like. While the following discussion specifically uses webbrowsers as one example application, one of ordinary skill in the art will appreciate that the methods, devices, systems, and machine-readable mediums may be applicable to other applications, such as those that enable file transfers. For example, FTP upload applications, email applications, and the like.

In some examples, the exfiltration detection application may include multiple components. For example, a first component may interface with a file system and a second component may interface with one or more browsers. The first component is alerted to one or more I/O requests and may perform one or more filtering processes to detect file system element events and to filter out I/O requests that indicate normal browser behavior and other behavior that is not indicative of exfiltration. In some examples, after the first filter, the first component may use an exfiltration model to determine whether a file system element event is indicative of exfiltration. File system element events that are indicative of exfiltration are processed by the second component which may interrogate the web-browser or other application or its components to gather context information about the user's activities with respect to the file system element event.

On devices executing a MICROSOFT® WINDOWS® operating system (O/S), the first component may be a kernel filter that is attached to an input/output stack of an operating system kernel. Input and Output (I/O) requests of an application are delivered to the driver stack by the O/S to perform the command. A kernel filter acts as a virtual device driver and processes the I/O request. Once processing is finished, the kernel filter passes the I/O request to the next filter or to the next driver in the stack. In this way, a kernel filter has access to all I/O requests within a system; including I/O requests that represent file system element events that relate to file system elements. In some examples, rather than being a filter, the first component may be a minifilter that is registered with a filter manager of an input/output stack of a Windows kernel. In some examples, the minifilter simplifies kernel filter development and management.

On devices executing an Apple operating system such as a macOS® the first component may utilize an event stream that provides I/O requests as one or more events in the stream. For example, an event stream provided by a Basic Security Module (BSM) or Endpoint Security Framework.

The first component may be a user mode component or a kernel mode component. For example, the minifilter may be a kernel mode component and the first component may be a user mode component on a macOS®.

As previously described, the first component may process I/O requests detected through an operating system interface to find file system element events that are of interest. As noted, in some examples, the first component may have a first filter that filters out all I/O requests that are related to a file system element. The I/O requests that relate to a file system element are file system element events. The first component may filter out the file system element events that are not related to a particular target application (e.g., a browser). The first filter may also filter out all events related to file system elements that are known to relate to normal browser behavior. For example, events for files in directories related to cookie storage, cached page storage, and the like. These directories and filters may be determined by filter criteria which may be developed based upon observation of each browser's characteristics and file usage patterns.

Events which make it through the first filter may be examined using an exfiltration model. In some examples, a single event may cause the first component to flag the file system element event as indicative of exfiltration. For example, if specific files or folders are involved in a file system element event or if a threshold number of files or a threshold number of bytes are transferred. In some examples, the first component may look at a series of file system element events and compare that to one or more exfiltration models to detect patterns of behavior.

The second component receives file system element events from the first component along with metadata about the event, the file system element event, and the application. The second component may gather context information about the user's activities within the application that caused the file system element event. Context information may include the website that the user used to generate the file element event(s) that is indicative of exfiltration, an account that the user is logged into on the website, a directory structure of a cloud-based file sharing or storage site where the files were uploaded to, a recipient of the files (if the site is an email site), and the like. This context information may be obtained, for example, by querying the browser through an Application Programming Interface (API); querying a database of the browser; or by screen capture techniques to capture a user interface of the browser. For example, a browser may store information about currently open windows or tabs such as a URL or site title in a browser database. For example, in Chrome, a user's website visits are stored in the "history SQLite database."

In some examples, the URL may not be made available by the browser, but the site title may be available. The second component may use the site title to determine a URL and thus the Internet site. For example, the website of Code42 may be titled "Code42-Insider Risk Detection, Response, and Management" That title may be used to determine that the site the user is visiting is www.code42.com and thus the main website of the Code42 company. In some examples, a database may map the site title to a site. In other examples, a list of sites of interest may be maintained, and the site title may be searched for those sites of interest. For example, searching "Code42-Insider Risk Detection, Response, and Management" for "code42.com," variants, partial matches, and the like. If the site title includes terms associated with those sites of interest, then an alert may be generated and sent to a management system. These sites of interest may be known websites that may enable file exfiltration. Example sites may include cloud-based sharing and storage sites, cloud email hosting sites (e.g., such as GMAIL®), and the like.

Account information may be used to determine whether the account associated with the transfer is a work account (which may be permissible) or a personal account (which may not be permissible). This information may be determined using screen scraping techniques—e.g., sites may list the username of the user that is logged in and this information may be scraped. Similarly, information about the user's account on the cloud-based file sharing or storage service such as a directory structure or other files uploaded may also be gathered using screen scraping techniques. If the site is a web-based email, the recipient of the email message may be gathered through scraping techniques as well.

The management system may utilize any alerts from the exfiltration application, along with other alerts and/or signals from detecting other anomalies to determine whether to notify an administrator. For example, a set of rules may determine which alerts, or combination of alerts, will trigger a notification to an administrator. The administrator may be alerted through a management computing device, such as part of a Graphical User Interface (GUI), a text message, an email, or the like. Other alerts may include alerts generated in response to a large number of files being copied to a Universal Serial Bus (USB) external device, a large amount of data transfer over a network, and the like.

The second component may also further filter the file system element event notifications and apply additional detection logic to try and increase accuracy and eliminate false positives. This may include applying one or more permit and reject lists. For example, if a site determined from the browser is in the permit list, the anomaly is not further processed. If the site name determined from the browser is in the reject lists, then an alert may be generated, and processing may continue. One or more of the permit lists and/or reject lists may be utilized alone or in conjunction.

FIG. 1 illustrates an example environment 100 for the exfiltration detection system according to some examples of the present disclosure. The exfiltration system may include one or more of an exfiltration application running on an endpoint device 110 and the administration service 125. The endpoint device 110 which may be a user computing device such as a desktop, laptop, tablet, smartphone, or the like. Exfiltration application executing on the endpoint device 110 monitors the endpoint device 110 and attempts to detect uploads of one or more files to a network-based location, such as files 130 uploaded to network-based service 120. The files that are uploaded may be files on local storage of the endpoint device 110. In other examples, the files may be on a remote storage device of an organization. That is, the endpoint device 110 may be logged into a corporate network and may attempt to upload files stored on a file storage system of the corporate network. Network-based service may include a file-sharing service, an email service, a social networking service, or the like.

The files may be transferred by using a web browser or other application over a network 115. Network 115 may be a packet-based network, such as one or more of a Local Area Network, Wide Area Network, Internet, or the like. For example, using packet-based communications over the network 115, endpoint device 110 may receive a web GUI interface provided by the network-based service 120; the user may navigate the web GUI interface; select a GUI element that provides the option to upload files; select one or more files through a file upload dialog; and the endpoint device 110 may begin transferring the files from the endpoint device 110, over network 115, to the network-based service 120. This triggers a file system element event for those files which is detected as an I/O request by the first component of the exfiltration application. The exfiltration detection application may then determine that the user is accessing a file sharing service and send an alert 140 to an administration service 125 with information about the file system element event. The alert may include information such as a hash of the file, date, time, Multipurpose Internet Mail Extensions (MIME) type, name of the website, and the like. In some examples, the administration service 125 may then inform an administrator. In other examples, the administration service 125 may perform other verifications. For example, the administration service 125 may check a MIME type of the event to see if the event matches one or more MIME types in a list of MIME types. If the MIME type matches one or more MIME types in a list, an alert may be generated.

Figure 2:
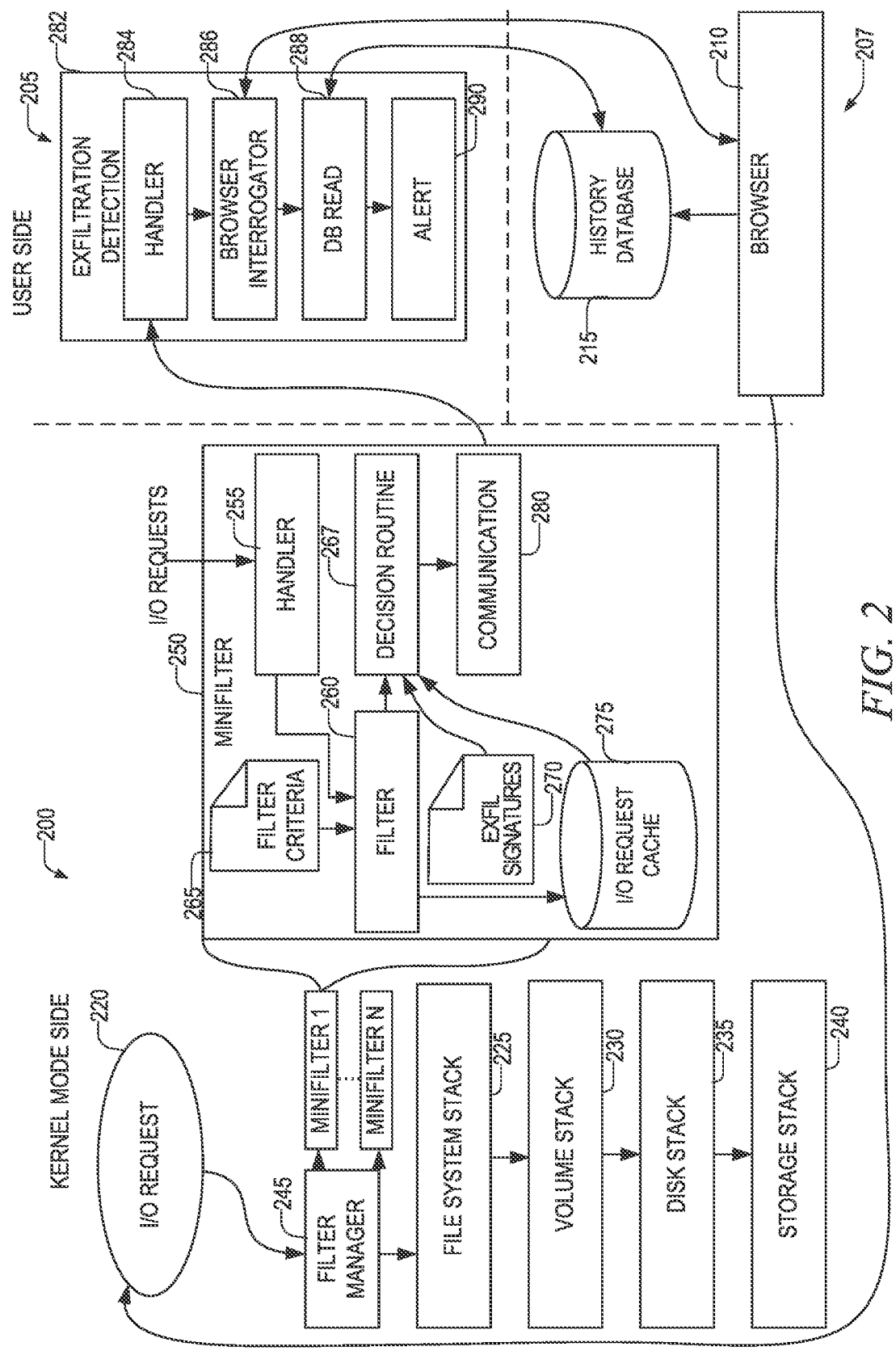
FIG. 2 illustrates the operation of an exfiltration detection application according to some examples of the present disclosure.

FIG. 2 illustrates the operation of an exfiltration detection application according to some examples of the present disclosure. In some examples, the exfiltration application may include a first component 200 that is a kernel mode component or application and a second component 205 that is a user-side component or application. Also shown is browser components 207, including a browser application 210 and history database 215. Browser application 210 sends various input/output (I/O) requests (e.g., such as requests for the contents of a file stored in a file system) to an operating system, for example, in conjunction with retrieving cached pages, cookies, stored data, resource files, and the like. Browser application 210 may also send I/O requests to an operating system when the browser accesses one or more files for uploading to a file sharing service (e.g., such as network-based service 120).

In some examples, an operating system may have a layered I/O model. For example, I/O requests, such as I/O request 220 flow through a device driver stack. An I/O request may be a request to perform some input or receive some output and include file system element events. For example, a file system stack 225 processes the I/O request and outputs the processed request to a volume stack 230. Volume stack 230 may process the received input from the file system stack 225 and passes its output to a disk stack 235. The disk stack 235 may take the output of the volume stack 230 and processes it and may provide its output to a storage stack 240. Storage stack 240 may read the request from disk and pass the results back up through the stack in the reverse direction. In some examples, an application may insert a filter device in the stack. For example, above a file system stack 225. This allows the filter to monitor I/O requests, such as I/O request 220.

In recent versions of some operating systems, and as shown in FIG. 2, to simplify management and implementations of filters, a filter manager may be inserted into the stack above the file system stack 225. Custom minifilters may then interface with the filter manager 245. The use of a filter manager and customizable filters may simplify filter development and management. In some examples, the first component of the exfiltration detection application, the kernel mode side may be in the form of a filter or minifilter, such as minifilter 250. In some examples, the minifilter 250 of the exfiltration detection application may only activate upon a file system element event and may not activate for other types of I/O. This may be accomplished by specifying the types of I/O that are of interest to the minifilter to the filter manager 245.

File system element events may be handled by the minifilter 250 initially by a handler routine 255. For example, the handler routine 255 may be called by the filter manager 245 upon receiving an I/O request that is a file system element event. The handler may call a filter 260 to perform a first layer of filtering. Filter 260 may use filter criteria 265 to determine if the file system element event is of interest to the minifilter 250 or is noise that can be ignored. The filter criteria 265 may specify which file system element event types are of interest, which files are of interest (or which file locations are of interest), which application sent the I/O request and the like. In general, filter criteria 265 may specify characteristics of the file requested, characteristics of the I/O request itself, and characteristics of the application that initiated the I/O request. Because the minifilter 250 may be called for any file system element event within a computing device or any file system element event for a particular application, filter 260 may serve to quickly eliminate events that are not of interest. In some examples, rather than receive all file system element events, the filter criteria 265 may be sent to the filter manager 245 such that the filter manager 245 passes only file system element events that match the filter criteria 265. In these examples, the filter 260 may not be present on the minifilter 250.

File system element events that pass the filter 260 may be passed to a decision routine 267 where additional factors may be considered. For example, an exfiltration signature model 270 may be a model that stores signatures of exfiltration or may be used to determine exfiltration and may be based upon past observed behavior that is labeled as being exfiltration or not-exfiltration. For example, the exfiltration signature model 270 may be rules that may examine one or more of: characteristics of the file requested, the I/O request itself; characteristics of the application, or history of previous I/O requests that passed the filter 260 that may be stored in a I/O request cache 275. For example, sequences of multiple I/O requests of certain types, with certain characteristics, or for certain files may indicate an exfiltration. In other examples, the exfiltration signature model 270 may be a machine learned model, such as described in FIG. 5. As noted, I/O requests for a particular period of time may be stored in the I/O request cache 275.

As noted, certain patterns or sequences of multiple I/O requests may be used to detect patterns of interest. For example, the filter criteria 265 may ignore all events except major create, major read, or major query information I/O events. The filter criteria 265 may ignore all events that are not from a process (e.g., browsers) that are being monitored. The decision routine 267 may utilize exfil signatures to detect not only file uploads, but file downloads. The exfil signatures 270 for file uploads may depend based upon the browser and operating system. For example, for Microsoft Windows systems and Chromium-based browsers, the decision routine 267 looks for a major read event proceeded by at least two major query information events with a subtype of FileNetworkOpenInformation. For Microsoft Windows systems and Firefox browsers the decision routine 267 looks for a major read event preceded by at least one major query information with a subtype of FileNetworkOpenInformation. For Microsoft Windows systems and older Microsoft Edge browsers (before it switched to Chromium-based), the decision routine 267 looks for a major read event preceded by least three major query information events with a subtype of FileNetworkOpenInformation. For Microsoft Windows systems and Internet Explorer, the decision routine 267 looks for a major read event proceeded by at least five major query information events with a subtype of FileNetworkOpenInformation. For Microsoft Windows systems and other processes that are not browsers, but other applications such as Secure Copy Protocol and File Transfer Protocol applications, the decision routine 267 looks for a major read event.

For download events, on Microsoft Windows systems with the decision routine 267 looks for a major create event with a subtype of FILE_CREATED or FILE_OVERWRTITEN generated by a monitored process and that the file that is the target of this event is having its Alternative Data Stream created or modified (mainstream browsers write to a file's ADS after downloading a file, as a flag to the Operating System that the file was downloaded from the internet).

The file system element event requests that match a signature of an exfiltration signature model 270 may be passed to a communication routine 280. Communication routine 280 may pass the event to a handler routine 284 of a user side component in the form of an exfiltration detection component 282. In some examples, the minifilter 250 may launch the exfiltration detection component 282 upon detecting one or more events. The handler may pass the file system element event to a browser interrogator 286 which may communicate with the browser application 210 to obtain details about the file system element event. For example, information about a website corresponding to the file system element event, such as the tab title of the tab that created the event, the URL of the website displayed in the tab, and the like. In some examples, the browser application 210 may not provide the website URL information to other applications. Instead, the browser may store user activity history in a database, such as history database 215. In these examples, the DB read routine 288 may query the history database 215 to obtain information about the website the user is or was visiting at the time of the file system element event. For example, the DB read routine 288 may use the tab title to obtain the URL of the website by querying the history database 215. In some examples, additional information is gathered from a screen scrape of the website (if it is still open) or from a cached version of the page or components of the page. For example, an account the user is logged into, a recipient of an email that the files were attached to, a directory listing of the directory the files were uploaded to, and the like. Information about the file system element event, the files that are the subject of the file system element event, the application that submitted the request, the website identified, and other information is packaged up by alert component 290 and sent as an alert (e.g., such as alert 140) to an administration service (e.g., such as administration service 125).

In some examples, the communication routine 280 may send a notification to the handler 284 after a first event of an event sequence so that the browser interrogator 286 can quickly grab the tab title of the presently open tab. This may increase the accuracy of the system because the tab title may change, or the user may close the tab quickly after the transfer or switch tabs. In other examples, tab titles may be dynamic. For example, an email account may have a tab title of "Inbox (109)-joe@gmail.com" where the "(109)" is a number of unread messages. The number of messages may change over the time that the tab is open. In these examples, the db read component 288 may search for URLs for tabs with tab titles that are close matches, but not exact matches, for example, by finding partial matches.

Figure 3:
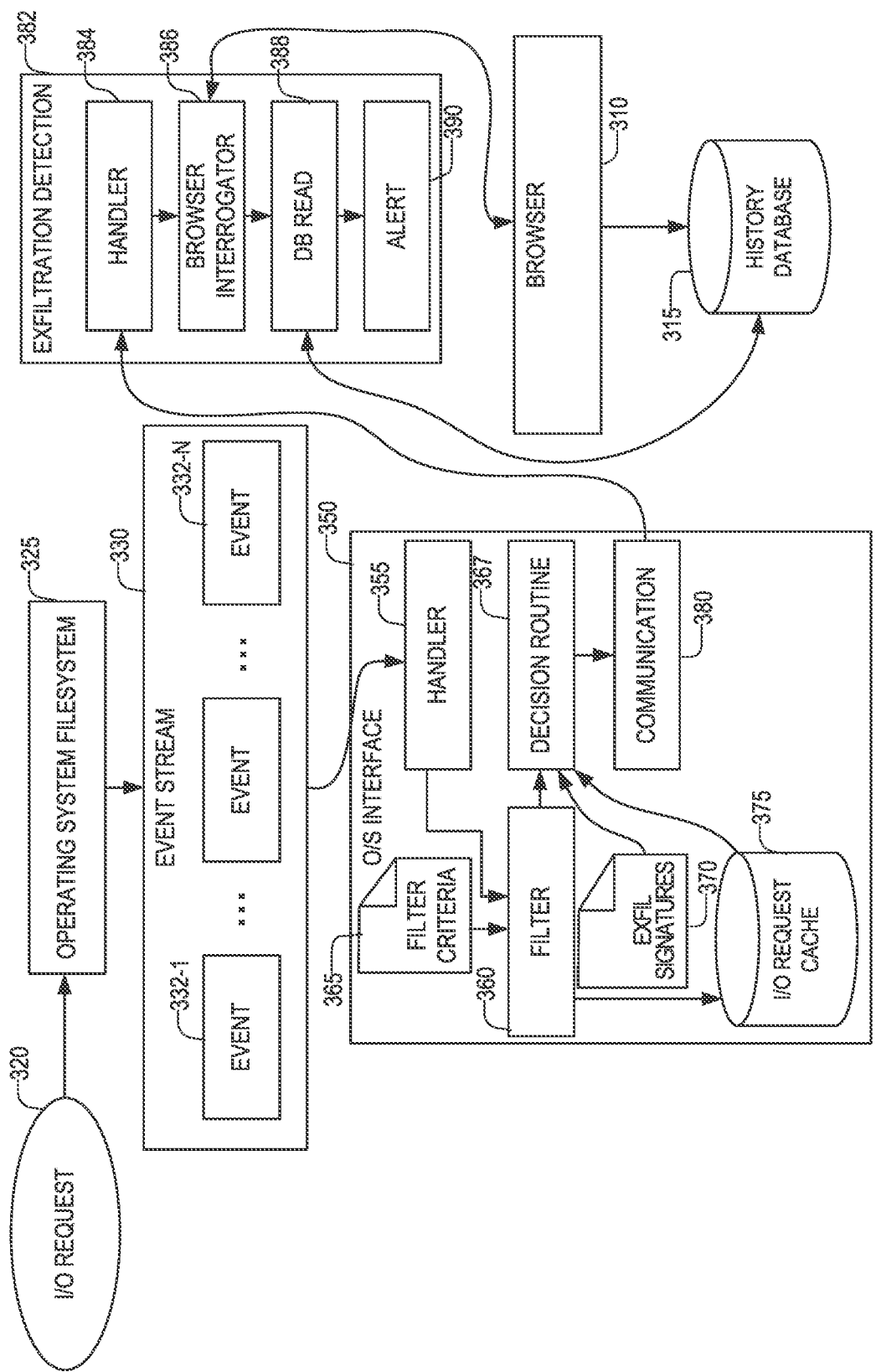
FIG. 3 illustrates the operation of another exfiltration detection application according to some examples of the present disclosure.

FIG. 3 illustrates the operation of another exfiltration detection application according to some examples of the present disclosure. In the example of FIG. 2, the first component was a kernel-mode minifilter. In the example of FIG. 3, the first component 350 is not a mini filter. Instead, the first component subscribes to an event stream 330 and reads events, such as event 332-1-332-N that are placed on the event stream by the operating system file system 325. The events are input/output events that correspond to input/output requests, such as I/O request 320. In some examples the event stream is a Basic Security Module (BSM) stream. In some examples, the event stream is a stream f-om an Endpoint Security Framework. As with FIG. 2, the events are processed by a handler 355 and filtered with a filter routine 360 using filter criteria 365 to detect file system element events of interest. As with FIG. 2, the decision routine 367 decides whether the file system element events of interest are to be sent to the exfiltration detection component 382 using exfiltration signature model 370, and past events in the event store 375. Communication routine 380 provides the events that meet the criteria for sending to the exfiltration detection component 382 from the decision routine. As with FIG. 2, The handler 384 may pass the events to a browser interrogator 386 which may communicate with the browser 310 to obtain details about the file system element events. For example, information about a website corresponding to the file system element events. In some examples, the browser 310 may not provide information to other applications. Instead, the browser may store user activity history in a database, such as history database 315. In these examples, the DB read routine 388 may query the history database 315 to obtain information about the website the user is visiting. Information about the file system element event, the files that are the subject of the event, the application that submitted the request, the website identified, and other information is packaged up by alert component 390 and sent as an alert (e.g., such as alert 140) to an administration service (e.g., such as administration service 125).

As with FIG. 2, the decision routine 367 may utilize sequences of file events. In some examples, FIG. 3 may depict an example implementation on MacOS systems. In these examples, the filter may filter out events with FilePath and ProcessPath that are null; the Event's Process ID matches the currently running Process ID; the Process Path matches one of the monitored applications; the File Path does not contain an excluded string (e.g., associated with temporary files or system directories); the Event Type=72 and the File Path does not end with "safari." The decision routine 367 may detect an exfiltration event if the Event Type and Event Flags match one of the following:

Type=72; Flags=17825796 or 32768
Type=47; Flags=493
Type=42; Flags=0 or 4 or 16777216
Type=3
Type=43025
Type=43190

Figure 4:
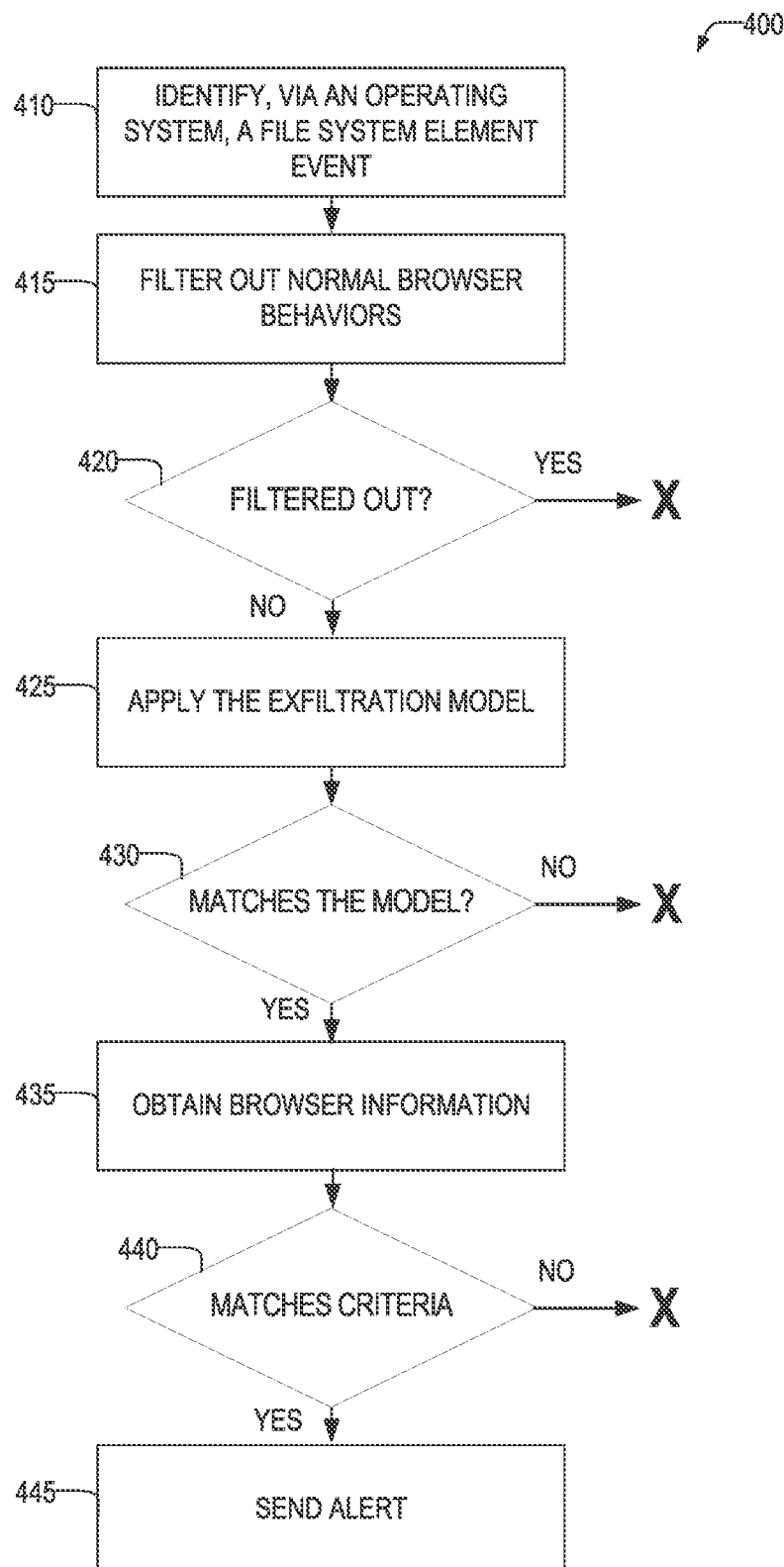
FIG. 4 illustrates a flowchart of a method of identifying indicators of a file exfiltration according to some examples of the present disclosure.

FIG. 4 illustrates a flowchart of a method 400 of identifying indicators of a file exfiltration according to some examples of the present disclosure. At operation 410, the file exfiltration detection application may detect a file system element event from an input/output request. For example, I/O requests that relate to the creation, modification, or deletion of file system elements (e.g., files). As previously noted, the file system element event may include file system elements on a remote machine that may be copied to a local file system (e.g., with changes that are synchronized across one or more other file systems of other computing devices and/or a filesystem of a cloud-based storage). In other examples, the application may detect exfiltration of files from one cloud-based storage account to another cloud-based storage account where such movements cache or save local temporary copies on a local file storage system. In some examples, along with the file system element event, the operating system may provide information about the file system element event, including file system element information, application information about the application that produced the event (such as an identifier of the application). This information may be used in operations of FIG. 4, including operation 435 and may be communicated to one or more components of the application from one or more other components. In other examples, once the file system element event is detected, the application may query the operating system for this information.

At operation 415, the application may filter out normal browser behaviors as previously observed. For example, by ignoring file system element events that come from certain directories and for certain types of files. For example, activity related to cookies, cached files, images, and other files that the browser normally uses. These exclusions may be based upon the file system element type, location, MIME type, contents, and the like. In other examples, rather than exclude certain file system elements, the application may have a list of file system elements that are to be protected. In this case, unless the file system element event is for one of the file system elements that are on the protected list, the event may be ignored. In some examples, this protected list may include a list of hashes of protected files. In these examples, if the hash of the file system element that corresponds to the file system element event does not match one of the hashes on the protected list, then the file system element event may be ignored.

A determination is made at operation 420 whether the file system element event is to be filtered out. If it is to be filtered out, then processing may end, and the application may wait for the next file system element event. Otherwise, at operation 425, the application may apply an exfiltration signature model to the file system element event. For example, a single file system element event may not be indicative of suspicious activity, however, a pattern of contemporaneous file system element events (e.g., the events occur within a predetermined period of time) may be indicative of suspicious activity. The model may consider the type of file system element event, the location of the file system element corresponding to the event, a size of the file system element event, and any other characteristic of the file system element event or the file system element corresponding to the event. In other examples, the application may consider aggregated characteristics of the file system element or file system element events that made it through filters applied at operations 415, 420 within a predetermined period of time. For example, an aggregated size of files transferred, and the like. In some examples, a pattern of file system element event types may be utilized.

If, at operation 430, the file system element event matches an exfiltration signature model (e.g., it appears to be an exfiltration), then processing continues to operation 435, otherwise the operation may cease until another file system element event is received. In some examples, in the case that the file system element event does not match the exfiltration model, the file system element event and/or metadata about the file system element event (e.g., characteristics of the file system element, the file system element event, or the like) may be stored for later use in the exfiltration model when evaluating a subsequent file system element event. In some examples, the system may store a predetermined number of file system element events or metadata, or file system element events or metadata for file system element events that occurred within a predetermined timeframe.

In some examples, operations 410-430 may be performed by a kernel mode component of the application such as a file system filter, a mini-filter, or may be performed by an application that monitors an event stream produced by an operating system as previously explained. In the examples in which operations 410-430 is performed by a different component of the application, upon the determination that the file system element event matches the exfiltration model, the first component may send a message to a second component, such as a user-mode component, that may perform operations 435-445. As will be appreciated by one of ordinary skill in the art, operations 410-445 may be performed as one user-mode process, a combination of user-mode and kernel mode processes, or entirely as a kernel-mode process.

At operation 435, the application may obtain browser information for the file system element event. The browser may be identified as part of the file system element event information received from the browser. The application may determine a website address of the website associated with the file system element event. As each browser may support different methods of obtaining this information, the application may have browser profiles that may select a retrieval method for this information. For example, the application may first determine, through an Application Programming Interface (API) with the browser, a tab title of a tab that caused the file system element event. The tab title may then be used to query a history database to determine a URL of the website displayed in that tab. In other examples, the application may scrape a GUI window of the browser. In yet other examples, the application may first obtain a tab title of the application process that generated the event and then the application may use the tab title to request information about open, or recently open, pages through an Application Programming Interface (API). In other examples, the exfiltration application may utilize a scripting bridge to the browser. In still other examples, the application may utilize one or more database commands that obtains website visit history from a database. The application may then correlate the time of the file system element event with the time of the page visit from the browser history to determine one or more candidate websites. In some examples, the website visit history may be a URL, or may be a website title. In examples in which the website visit history is a website title, the system may use a table (that may be periodically updated automatically) that correlates website titles to website URLs. In other examples, the system may have a list of URLs and may search for a partial or whole match of the URL in the site title. For example, may sites have titles that incorporate one or more portions of the URL. In some examples, even partial matches may establish a website candidate that is then checked against the criteria at operation 440.

While at operation 435 the browser information is obtained when the exfiltration model is matched, in other examples, portions of the browser information may be obtained earlier. That is, upon a partial match of the exfiltration model, the system may obtain some or all of the browser information as early as possible to prevent issues if the user switches tabs or the like. An alert would not be sent in these examples until the exfiltration model is matched, however. For example, upon matching one or more events in a sequence of events, the system may obtain the currently open tab of a browser that generated the event. If the sequence of events eventually matches (e.g., after subsequent events are observed) the event sequence in the exfiltration model 425, the system uses the tab title to obtain the URL of that tab.

At operation 440, if the website (or one or more of the candidate websites) matches one or more criteria, then at operation 445, the application may send an alert to an administrator. Websites such as file sharing applications, email applications, and other communication applications may be listed in the criteria for generating an alert. The criteria may be a list of websites that feature file sharing abilities or capabilities.

While the above description mentioned web-browsers, one of ordinary skill in the art will appreciate that the methods, devices, systems, and machine-readable mediums may be applicable to other applications, such as those that enable file transfers. For example, FTP upload applications, email applications, and the like.

Figure 5:
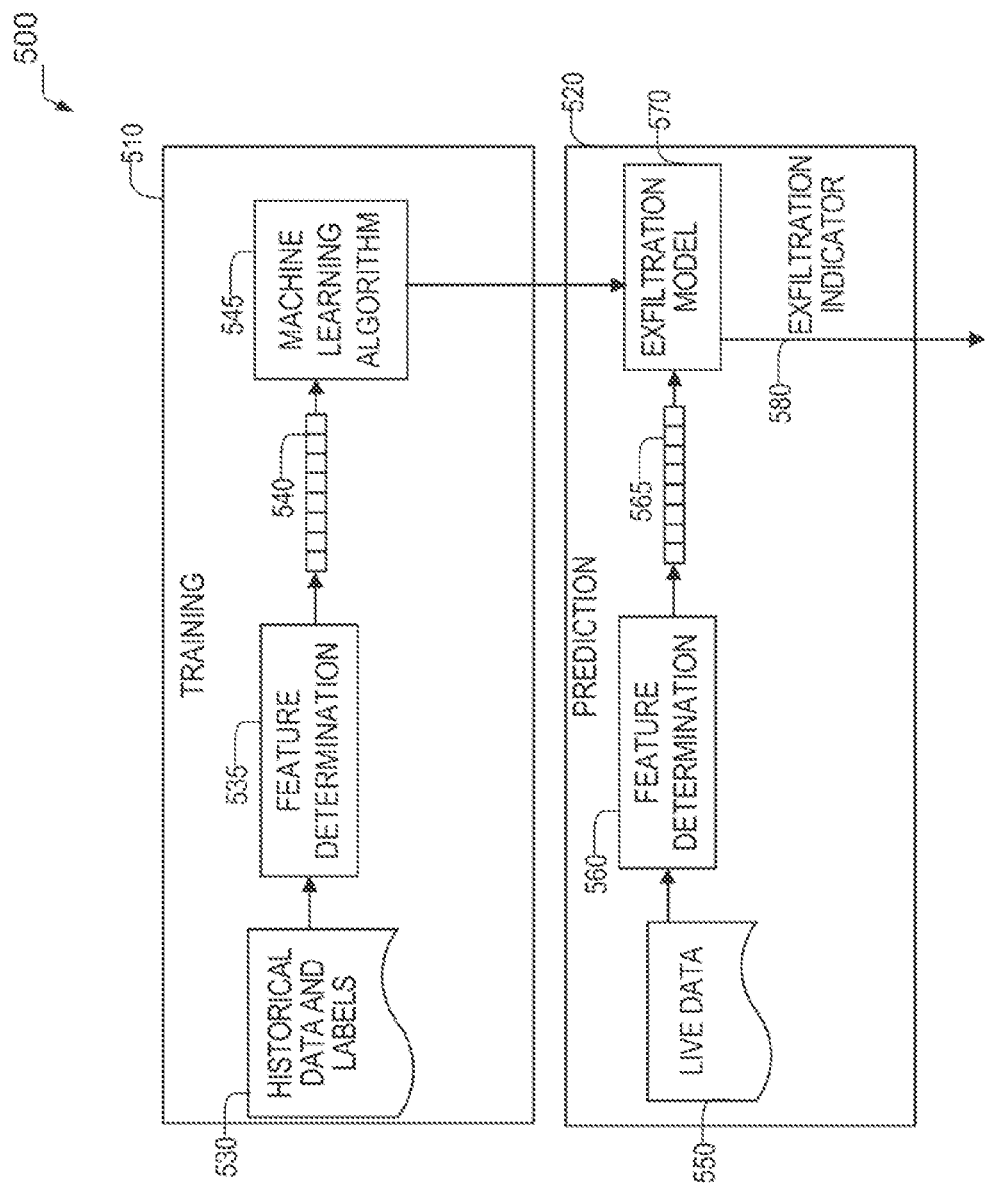
FIG. 5 shows an example machine learning module for determining whether a file system element event is potentially an exfiltration event according to some examples of the present disclosure.

FIG. 5 shows an example machine learning module 500 for determining whether a file system element event is potentially an exfiltration event according to some examples of the present disclosure. Machine learning module 500 utilizes a training module 510 and a prediction module 520. Training module 510 inputs historical data 530 into feature determination module 535. The historical data may include one or more of: historical file system element events, metadata about those events, information about the file system elements corresponding to those events, and information about an application associated with those events. The historical data 530 may be labeled indicating whether the historical data is considered suspicious of exfiltration activity.

Feature determination module 535 determines one or more features 540 from this information. Features 540 are a set of the historical data and labels determined to be predictive of whether or not a particular file system element event is suspicious. In some examples, the features 540 may be all the historical contexts and labels. Feature determination module 535 may also include formatting, adjusting, normalizing, or otherwise transforming the input data. Feature determination module 535 may also be performed as part of the machine learning algorithm 545. For example, a neural network may discover which input data is predictive of a desired output through a backpropagation algorithm that assigns weights to inputs of one or more neurons of one or more weights. In this way, input data that is highly predictive of a desired result will have a higher weight than data that is less predictive. The machine learning algorithm 545 produces an exfiltration signature model 570 based upon the features 540 and the label. The exfiltration signature model 570 may be an example of exfiltration signature model 270 and 370.

In the prediction module 520, live data 550 may be input to the feature determination module 560. The live data 550 is a received file system element event, metadata about the file system element event, information about the file system element corresponding to the file system element event, information about the application, information about past file system element events, or the like. Feature determination module 560 may determine the same set of features or a different set of features as feature determination module 535. In some examples, feature determination modules 535 and 560 are the same module. Feature determination module 560 produces feature vector 565, which are input into the exfiltration signature model 570 to generate an indication of whether exfiltration is indicated 580. The training module 510 may operate in an offline manner to train the exfiltration signature model 570. The prediction module 520, however, may be designed to operate in an online manner. It should be noted that the exfiltration signature model 570 may be periodically updated via additional training and/or user feedback.

The machine learning algorithm 545 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck methods. Unsupervised models may not have a training module 510.

Figure 6:
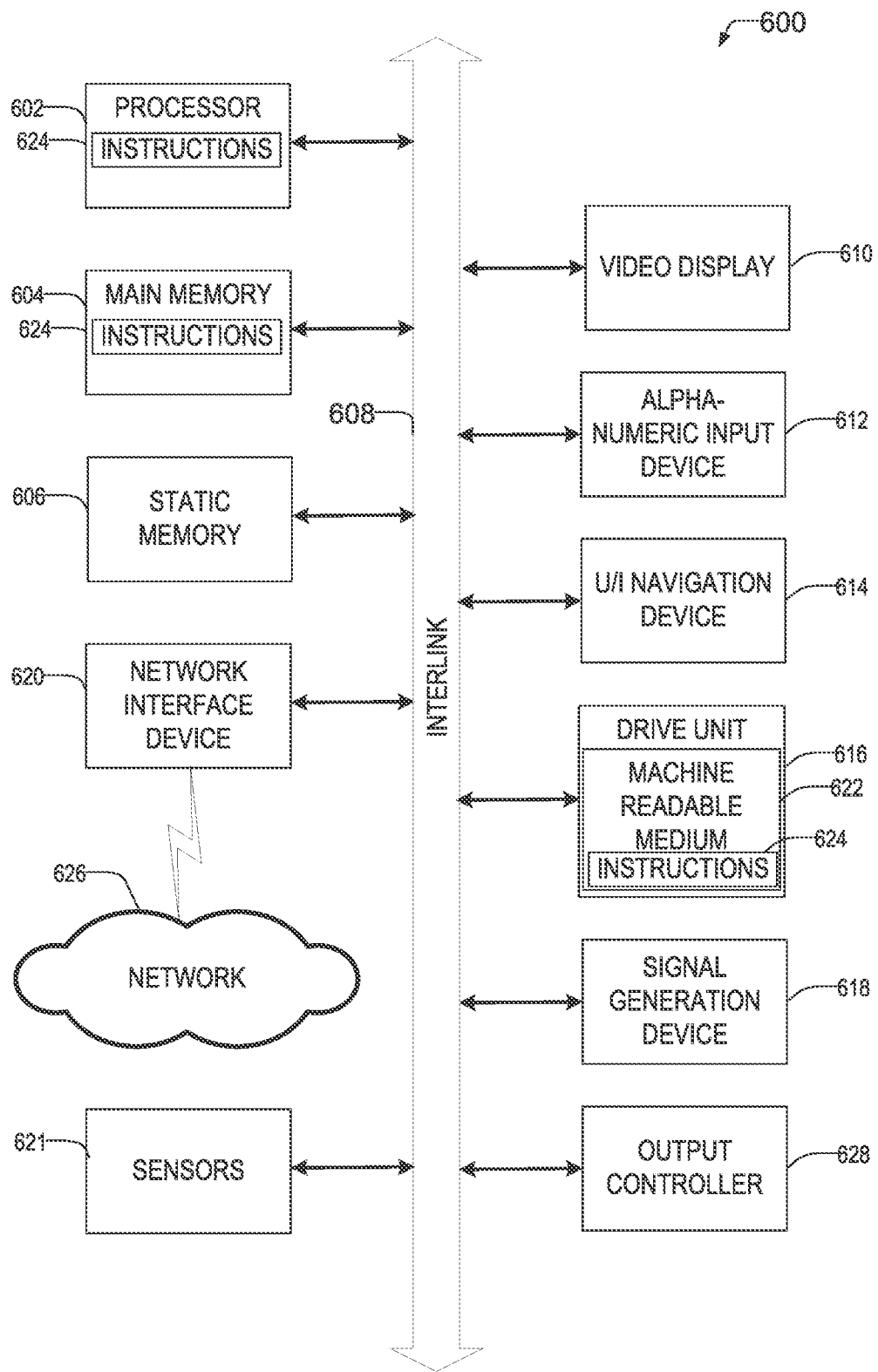
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 600 may, alone or in combination with other machines, implement an endpoint device 110, network-based service 120, network 115, administration service 125. Machine 600 may be configured to implement any one or more of the components and/or applications of FIGS. 2, 3, and 5; and be configured to implement the method of FIG. 4. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Other Notes and Examples

Example 1 is a method for detecting file exfiltration, the method comprising: using one or more processors, executing an exfiltration detection application, the exfiltration detection application performing operations comprising: identifying a file system element event using an operating system interface; determining that the file system element event corresponds to a web-browser application, the web-browser application a separate application from the exfiltration detection application; responsive to determining that the file system element event corresponds to the web-browser application, determining whether the file system element event matches an exfiltration signature model that considers one or more characteristics of the file system element event or a second file system element event; responsive to determining that the file system element event matches the exfiltration signature model, determining a website visited by the web-browser application corresponding to the file system element event; determining, based upon the website visited, whether to send an alert to an administrative computing device; and responsive to determining that an alert is to be sent, sending the alert to the administrative computing device, the alert indicating that a file system element event that is characteristic of an unauthorized file exfiltration has been detected.

In Example 2, the subject matter of Example 1 includes, wherein identifying the file system element event comprises installing a minifilter in a filter manager of a file system in a kernel mode.

In Example 3, the subject matter of Examples 1-2 includes, wherein identifying the file system element event comprises reading an event stream of file system element events provided by an operating system.

In Example 4, the subject matter of Example 3 includes, wherein the event stream is provided by a Basic Security Module or an Endpoint Security Framework.

In Example 5, the subject matter of Examples 1-4 includes, wherein determining the website visited by the web-browser application corresponding to the file system element event comprises reading a database kept by the web-browser storing a browsing history.

In Example 6, the subject matter of Examples 1-5 includes, wherein determining the website visited by the web-browser application corresponding to the file system element event comprises utilizing a scripting bridge.

In Example 7, the subject matter of Examples 1-6 includes, wherein determining whether the file system element event matches the exfiltration signature model that considers the one or more characteristics or the second file system element event comprises identifying an exfiltration pattern using the file system element event and the second file system element event.

Example 8 is a device for detecting file exfiltration, the device comprising: one or more processors; a memory, storing instructions, which when executed by the one or more processors, cause the one or more processors to perform operations comprising: executing an exfiltration detection application, the exfiltration detection application performing operations comprising: identifying a file system element event using an operating system interface; determining that the file system element event corresponds to a web-browser application, the web-browser application a separate application from the exfiltration detection application; responsive to determining that the file system element event corresponds to the web-browser application, determining whether the file system element event matches an exfiltration signature model that considers one or more characteristics of the file system element event or a second file system element event; responsive to determining that the file system element event matches the exfiltration signature model, determining a website visited by the web-browser application corresponding to the file system element event; determining, based upon the website visited, whether to send an alert to an administrative computing device; and responsive to determining that an alert is to be sent, sending the alert to the administrative computing device, the alert indicating that a file system element event that is characteristic of an unauthorized file exfiltration has been detected.

In Example 9, the subject matter of Example 8 includes, wherein identifying the file system element event comprises installing a minifilter in a filter manager of a file system in a kernel mode.

In Example 10, the subject matter of Examples 8-9 includes, wherein identifying the file system element event comprises reading an event stream of file system element events provided by an operating system.

In Example 11, the subject matter of Example 10 includes, wherein the event stream is provided by a Basic Security Module or an Endpoint Security Framework.

In Example 12, the subject matter of Examples 8-11 includes, wherein determining the website visited by the web-browser application corresponding to the file system element event comprises reading a database kept by the web-browser storing a browsing history.

In Example 13, the subject matter of Examples 8-12 includes, wherein determining the website visited by the web-browser application corresponding to the file system element event comprises utilizing a scripting bridge.

In Example 14, the subject matter of Examples 8-13 includes, wherein determining whether the file system element event matches the exfiltration signature model that considers the one or more characteristics or the second file system element event comprises identifying an exfiltration pattern using the file system element event and the second file system element event.

Example 15 is a non-transitory, machine-readable medium, storing instructions, which when executed by a machine, causes the machine to perform operations comprising: executing an exfiltration detection application, the exfiltration detection application performing operations comprising: identifying a file system element event using an operating system interface; determining that the file system element event corresponds to a web-browser application, the web-browser application a separate application from the exfiltration detection application; responsive to determining that the file system element event corresponds to the web-browser application, determining whether the file system element event matches an exfiltration signature model that considers one or more characteristics of the file system element event or a second file system element event; responsive to determining that the file system element event matches the exfiltration signature model, determining a website visited by the web-browser application corresponding to the file system element event; determining, based upon the website visited, whether to send an alert to an administrative computing device; and responsive to determining that an alert is to be sent, sending the alert to the administrative computing device, the alert indicating that a file system element event that is characteristic of an unauthorized file exfiltration has been detected.

In Example 16, the subject matter of Example 15 includes, wherein identifying the file system element event comprises installing a minifilter in a filter manager of a file system in a kernel mode.

In Example 17, the subject matter of Examples 15-16 includes, wherein identifying the file system element event comprises reading an event stream of file system element events provided by an operating system.

In Example 18, the subject matter of Example 17 includes, wherein the event stream is provided by a Basic Security Module or an Endpoint Security Framework.

In Example 19, the subject matter of Examples 15-18 includes, wherein determining the website visited by the web-browser application corresponding to the file system element event comprises reading a database kept by the web-browser storing a browsing history.

In Example 20, the subject matter of Examples 15-19 includes, wherein determining the website visited by the web-browser application corresponding to the file system element event comprises utilizing a scripting bridge.

In Example 21, the subject matter of Examples 15-20 includes, wherein determining whether the file system element event matches the exfiltration signature model that considers the one or more characteristics or the second file system element event comprises identifying an exfiltration pattern using the file system element event and the second file system element event.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method for detecting file exfiltration, the method comprising:
    using one or more processors, executing an application, the application performing operations comprising:
    identifying a file system element event corresponding to a file system element via an operating system;
    determining that the file system element event corresponds to a web-browser application, the web-browser application a separate application from the application;
    responsive to determining that the file system element event corresponds to the web-browser application:
    determining a website visited by the web-browser application corresponding to the file system element event;
    identifying that the website visited by the web-browser application is a network-based file storage or sharing service;
    identifying an account used to access the network-based file storage or sharing service;
    determining that the account used to access the network-based file storage or sharing service is not an account of an organization associated with the file system element;
    determining to send an alert to an administrative computing device based upon the identifying that the website visited by the web-browser application is the network-based file storage or sharing service and based upon determining that the account used to access the network-based file storage or sharing service is a personal account; and
    responsive to determining that an alert is to be sent, sending the alert to the administrative computing device, the alert indicating that the file system element event that is characteristic of an unauthorized file exfiltration has been detected.

2. The method of claim 1, wherein identifying the file system element event comprises utilizing a minifilter in a filter manager of a file system in a kernel mode.

3. The method of claim 1, wherein identifying the file system element event comprises reading an event stream of file system element events provided by the operating system.

4. The method of claim 3, wherein the event stream is provided by a Basic Security Module or an Endpoint Security Framework.

5. The method of claim 1, wherein determining the website visited by the web-browser application corresponding to the file system element event comprises reading a database kept by the web-browser application storing a browsing history.

6. The method of claim 1, wherein determining the website visited by the web-browser application corresponding to the file system element event comprises utilizing a scripting bridge.

7. The method of claim 1, wherein identifying the account used to access the network-based file storage or sharing service comprises using screen scraping to identify the account.

8. A computing device for detecting file exfiltration, the device comprising:
    one or more processors;
    a memory, storing instructions, which when executed by the one or more processors, cause the one or more processors to perform operations of an application, the operations of the application comprising:
    identifying a file system element event corresponding to a file system element via an operating system;
    determining that the file system element event corresponds to a web-browser application, the web-browser application a separate application from the application;
    responsive to determining that the file system element event corresponds to the web-browser application:
    determining a website visited by the web-browser application corresponding to the file system element event;
    identifying that the website visited by the web-browser application is a network-based file storage or sharing service;

identifying an account used to access the network-based file storage or sharing service;

determining that the account used to access the network-based file storage or sharing service is not an account of an organization associated with the file system element;

determining to send an alert to an administrative computing device based upon the identifying that the website visited by the web-browser application is the network-based file storage or sharing service and based upon determining that the account used to access the network-based file storage or sharing service is a personal account; and responsive to determining that an alert is to be sent, sending the alert to the administrative computing device, the alert indicating that the file system element event that is characteristic of an unauthorized file exfiltration has been detected.

9. The computing device of claim 8, wherein identifying the file system element event comprises utilizing a minifilter in a filter manager of a file system in a kernel mode.

10. The computing device of claim 8, wherein identifying the file system element event comprises reading an event stream of file system element events provided by the operating system.

11. The computing device of claim 10, wherein the event stream is provided by a Basic Security Module or an Endpoint Security Framework.

12. The computing device of claim 8, wherein determining the website visited by the web-browser application corresponding to the file system element event comprises reading a database kept by the web-browser application storing a browsing history.

13. The computing device of claim 8, wherein determining the website visited by the web-browser application corresponding to the file system element event comprises utilizing a scripting bridge.

14. The computing device of claim 8, wherein identifying the account used to access the network-based file storage or sharing service comprises using screen scraping to identify the account.

15. A non-transitory machine-readable medium, storing instructions for detecting file exfiltration, the instructions, which when executed by a computing device, causes the computing device to perform operations comprising:

identifying a file system element event corresponding to a file system element via an operating system;

determining that the file system element event corresponds to a web-browser application, the web-browser application a separate application from the application;

responsive to determining that the file system element event corresponds to the web-browser application:

determining a website visited by the web-browser application corresponding to the file system element event;

identifying that the website visited by the web-browser application is a network-based file storage or sharing service;

identifying an account used to access the network-based file storage or sharing service;

determining that the account used to access the network-based file storage or sharing service is not an account of an organization associated with the file system element;

determining to send an alert to an administrative computing device based upon the identifying that the website visited by the web-browser application is the network-based file storage or sharing service and based upon determining that the account used to access the network-based file storage or sharing service is a personal account; and responsive to determining that an alert is to be sent, sending the alert to the administrative computing device, the alert indicating that the file system element event that is characteristic of an unauthorized file exfiltration has been detected.

16. The non-transitory machine-readable medium of claim 15, wherein identifying the file system element event comprises utilizing a minifilter in a filter manager of a file system in a kernel mode.

17. The non-transitory machine-readable medium of claim 15, wherein identifying the file system element event comprises reading an event stream of file system element events provided by the operating system.

18. The non-transitory machine-readable medium of claim 17, wherein the event stream is provided by a Basic Security Module or an Endpoint Security Framework.

19. The non-transitory machine-readable medium of claim 15, wherein determining the website visited by the web-browser application corresponding to the file system element event comprises reading a database kept by the web-browser application storing a browsing history.

20. The non-transitory machine-readable medium of claim 15, wherein determining the website visited by the web-browser application corresponding to the file system element event comprises utilizing a scripting bridge.

* * * * *